(12) United States Patent
Kim et al.

(10) Patent No.: US 9,927,569 B2
(45) Date of Patent: Mar. 27, 2018

(54) DISPLAY DEVICE

(71) Applicant: Samsung Display CO., Ltd., Yongin-Si, Gyeonggi-do (KR)

(72) Inventors: Youngchun Kim, Seoul (KR); Kyung-min Kim, Hwaseong-si (KR); Junghoon Shin, Seongnam-si (KR); Byoungdae Ye, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 237 days.

(21) Appl. No.: 14/882,646

(22) Filed: Oct. 14, 2015

(65) Prior Publication Data

US 2016/0170125 A1    Jun. 16, 2016

(30) Foreign Application Priority Data

Dec. 10, 2014    (KR) .......................... 10-2014-0177631

(51) Int. Cl.
*F21V 8/00*    (2006.01)

(52) U.S. Cl.
CPC ......... *G02B 6/0031* (2013.01); *G02B 6/0091* (2013.01); *G02B 6/0068* (2013.01)

(58) Field of Classification Search
CPC ... G02B 6/0031; G02B 6/0091; G02B 6/0068
See application file for complete search history.

(56) References Cited

U.S. PATENT DOCUMENTS

| | | | |
|---|---|---|---|
| 2010/0177534 A1* | 7/2010 | Ryu | G02B 6/0068 362/606 |
| 2013/0182456 A1 | 7/2013 | Chin | |
| 2013/0207137 A1 | 8/2013 | Lee | |

FOREIGN PATENT DOCUMENTS

| | | |
|---|---|---|
| JP | 2012-009794 A | 1/2012 |
| KR | 20-2000-0003109 U | 2/2000 |
| KR | 10-2010-0030389 A | 3/2010 |
| KR | 10-2013-0022121 A | 3/2013 |
| KR | 10-2013-0067591 A | 6/2013 |
| KR | 10-2014-0061015 A | 5/2014 |
| KR | 20140061015 A * | 5/2014 |

* cited by examiner

*Primary Examiner* — David V Bruce
(74) *Attorney, Agent, or Firm* — H.C. Park & Associates, PLC

(57) ABSTRACT

A display device includes a display panel receiving light and displaying an image, a light guide plate guiding the light to the display panel, a printed circuit board disposed adjacent to one side of the light guide plate and including first and second areas alternately defined therein, light sources mounted on the printed circuit board to correspond to the first area and to supply the light to the light guide plate, a first barrier wall disposed on the printed circuit board and extending in a direction in which the light sources are arranged, and a second barrier wall facing the first barrier wall such that the light sources are disposed between the first and second barrier walls, the second barrier wall disposed on the printed circuit board, and extending in the direction.

14 Claims, 7 Drawing Sheets

DISPLAY DEVICE

CLAIM OF PRIORITY

This application makes reference to, incorporates the same herein, and claims all benefits accruing under 35 U.S.C. § 119 from an application earlier filed in the Korean Intellectual Property Office on 10 Dec. 2014 and there duly assigned Serial No. 10-2014-0177631.

BACKGROUND OF THE INVENTION

Field of the Invention

The present disclosure relates to a display device. More particularly, the present disclosure relates to a display device having improved light-use efficiency.

Description of the Related Art

A non-self-emissive display device, such as a liquid crystal display device, an electrophoretic display device, an electrowetting display device, etc., requires a separate backlight unit to generate light. The backlight unit is classified into an edge-illumination type backlight unit and a direct-illumination type backlight unit according to a position of a light source with respect to a display screen on which an image is displayed. The edge-illumination type backlight unit has a relatively thinner thickness than that of the direct-illumination type backlight unit. Accordingly, a mobile display device mainly employs the edge-illumination type backlight unit.

SUMMARY OF THE INVENTION

The present disclosure provides a display device having improved light-use efficiency.

Embodiments of the inventive concept provide a display device including a display panel, a light guide plate, a printed circuit board, a plurality of light sources, a first barrier wall, and a second barrier wall. The display panel receives light and displays an image. The light guide plate guides the light to the display panel. The printed circuit board is disposed adjacent to one side of the light guide plate and includes first and second areas alternately defined therein. The light sources are mounted on the printed circuit board to correspond to the first area and to supply the light to the light guide plate. The first barrier wall is disposed on the printed circuit board and extends in a direction in which the light sources are arranged. The second barrier wall faces the first barrier wall such that the light sources are disposed between the first and second barrier walls, the second barrier wall is disposed on the printed circuit board, and extends in the direction in which the light sources are arranged. A first distance between the first and second barrier walls in the first area is greater than a second distance between the first and second barrier walls in the second area, and the second distance is smaller than a thickness of the light guide plate.

The first barrier wall includes a first reflective member disposed in the first area and reflecting the light emitted from the light sources to the light guide plate and a first support member disposed in the second area and supporting the light guide plate to allow the light sources to be spaced apart from the light guide plate. The second barrier wall includes a second reflective member disposed in the first area and reflecting the light emitted from the light sources to the light guide plate and a second support member disposed in the second area and supporting the light guide plate to allow the light sources to be spaced apart from the light guide plate.

When the first reflective member and the first support member are integrally formed with each other and the second reflective member and the second support member are integrally formed with each other, the first barrier wall is bent toward the second barrier wall in the second area and the second barrier all is bent toward the first barrier all in the second area.

Each of the first and second reflective members extends in the direction, in which the light sources are arranged, and is disposed on the first and second areas, the first support member is protruded from the first reflective member to the second barrier wall in the second area, and the second support member is protruded from the second barrier wall to the first barrier wall in the second area.

The first and second reflective members include a reflective material and the first and second support members include a light transmissive material.

The first barrier wall includes a first auxiliary portion disposed on the printed circuit board and a first elastic portion disposed on the first auxiliary portion and having elasticity. The second barrier wall includes a second auxiliary portion disposed on the printed circuit board and a second elastic portion disposed on the second auxiliary portion and having elasticity.

Each of the first and second barrier walls has a height greater than a height of the light sources.

A cross-section of each of the first and second barrier walls has a width gradually decreasing as a distance from the printed circuit board becomes larger.

A surface of each of the first and second barrier walls, which makes contact with the light guide plate, has a round shape.

Each of the first and second barrier walls includes a sidewall inclined with respect to the printed circuit board.

Each of the light sources is a chip-on-board (COB) type light emitting diode (LED).

Each of the first and second barrier walls includes a reflective material.

Embodiments of the inventive concept provide a display device including a display panel, a light guide plate, a plurality of light sources, a printed circuit board, a first barrier wall, and a second barrier wall. The display panel, receives a light and displays an image. The light guide plate guides the light to the display panel. The light sources are disposed adjacent to one side of the light guide plate to supply the light to the light guide plate. The light sources are mounted on the printed circuit board. The first barrier wall is disposed on the printed circuit board and extends in a direction in which the light sources are arranged. The second barrier wall faces the first barrier wall such that the light sources are disposed between the first and second barrier walls and extends in the direction in which the light sources area arranged. The first and second barrier walls are interposed between the printed circuit board and the light guide plate, and an area of a surface of each of the first and second barrier walls, which makes contact with the light guide plate, is smaller than an area of a surface of each of the first and second barrier walls, which makes contact with the printed circuit board.

Each of the first and second barrier walls includes a sidewall inclined with respect to the printed circuit board.

A surface of each of the first and second barrier walls, which makes contact with the light guide plate, has a round shape.

According to the above, the light radiation angle of the light emitted from the light sources in the thickness direction of the light guide plate is reduced by the first and second barrier walls. As a result, the amount of the light incident to the light guide plate is increased, and thus the light incident efficiency is improved and the light use efficiency of the display device is improved.

In addition, the distance between the light guide plate and the light sources is maintained by the first and second barrier walls, so that the light sources are prevented from being damaged by the light guide plate.

Further, the first and second barrier walls include the elastic member having the elasticity, and thus the light guide plate is prevented from being bent due to a heat expansion.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
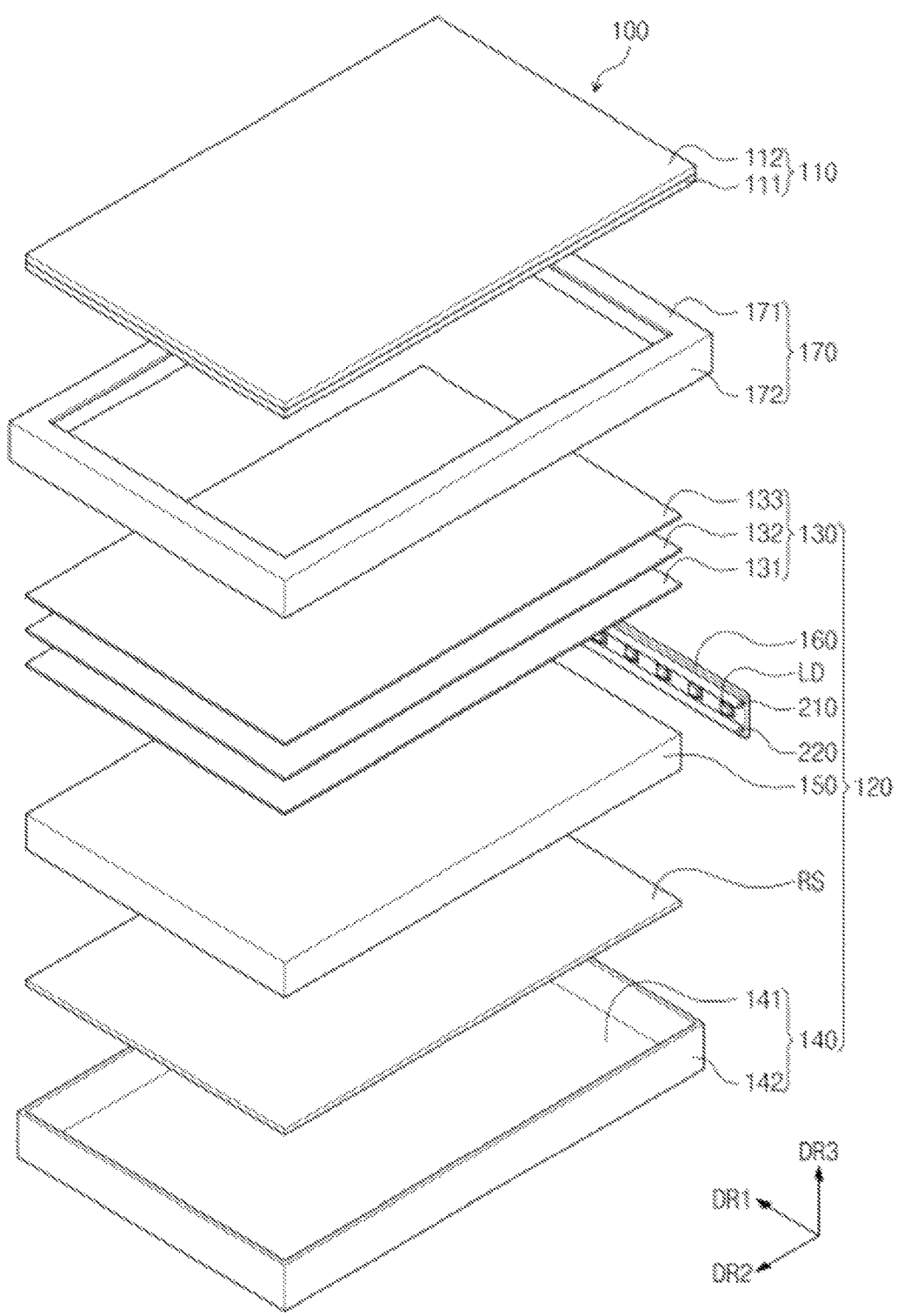
FIG. 1 is an exploded perspective view showing a display device according to an exemplary embodiment of the present disclosure.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

FIG. 1 is an exploded perspective view showing a display device 100 according to an exemplary embodiment of the present disclosure.

In reference to FIG. 1, the display device 100 includes a display panel 110, a backlight unit 120, and a mold frame 170.

The display panel 110 displays an image. The display panel 110 is a liquid crystal display panel, an electrowetting display panel, an electrophoretic display panel, or a microelectromechanical system display panel. In the present exemplary embodiment, the liquid crystal display panel will be described as the display panel 110.

The display panel 110 has a quadrangular plate shape with two pairs of sides, in the present exemplary embodiment, the display panel 110 may have a rectangular shape of a pair of long sides and a pair of short sides. The display panel 110 includes a display substrate 111, an opposite substrate 112 facing the display panel 111, and a liquid crystal layer (not shown) interposed between the display substrate 111 and the opposite substrate 112. The display panel 110 includes a display area in which an image is displayed and a non-display area surrounding the display area, in which the image is not displayed.

The backlight unit. 120 is disposed under the display panel 110 to supply a light to the display panel 110. The backlight unit 120 includes optical sheets 130, an accommodating part 140, a light guide plate 150, a reflective sheet RS, a printed circuit board 160, light sources LD, a first barrier wall 210, and a second barrier wall 220.

The accommodating part 140 includes a bottom portion 141 and a sidewall 142 extending from the bottom portion 141. The sidewall 142 extends upward from the bottom portion 141. The accommodating part 140 accommodates the light sources LID and the light guide plate 150, and the light sources LD and the light guide plate 150 are placed on the bottom portion 141.

The light guide plate 150 receives the light from the light sources LD and guides the light to the display panel 110. Although not restrictive to usual matters, the light guide plate 150 includes at least one of polyamide (PA), polymethyl methacrylate (PMMA), methyl methacrylate-styrene (MS), and polycarbonate (PC).

The light guide plate 150 has a plate-like shape defined by two sides extending in a first direction DR1 and two sides extending in a second direction DR2. Hereinafter, a thickness direction of the light guide plate 150 is referred to as a third direction DR3 substantially perpendicular to the first and second directions DR1 and DR2. The light guide plate 150 has a thickness of about 0.5 mm to about 3 mm, but the thickness of the light guide plate 150 should not be limited thereto or thereby.

The light sources LD are mounted on the printed circuit board 160 and applied with a driving voltage from the printed circuit board. The light sources LD are arranged on the printed circuit board 160 along the first direction DR1.

In the present exemplary embodiment, each of the light sources LD may be, but not limited to, a chip-on-board (COB) type light emitting diodes (LEDs). Each COB type LED has a light radiation angle of about 140 degrees or more. Accordingly, a distance between the light sources LD spaced apart from each other in the first direction DR1 becomes larger, and thus the number of the light sources LD is reduced.

The first and second barrier walls 210 and 220 are disposed on the printed circuit board 160. The first and second barrier walls 210 and 220 extend along the first direction DR1 in which the light sources LD are arranged. The first and second barrier walls 210 and 220 face each other such that the light sources LD are disposed between the first and second barrier walls 210 and 220.

Each of the first and second barrier walls 210 and 220 reflects the light emitted from the light sources LD. Due to the first and second barrier walls 210 and 220, the light radiation angle in the third direction DR3 of the light emitted from the light sources LD may be controlled. For instance, when the light radiation angle in the third direction DR3 of the light emitted from the light sources LD is larger, an amount of the light leaked through the light guide plate 150 is increased, and as a result, an amount of the light emitted from the light sources LD and incident to the light guide plate 150 is reduced. However, according to the present exemplary embodiment, the light radiation angle in the third direction DR3 is reduced by the first and second barrier walls 210 and 220, and thus a light-use efficiency of the light incident to the light guide plate 150 is improved. Therefore, the light-use efficiency of the display device 100 is improved.

In addition, a distance between the light guide plate 150 and the light sources LD is maintained by the first and second barrier walls 210 and 220. Thus, the light sources LD may be prevented from being damaged due to the light guide plate 150.

Each of the first and second barrier walls 210 and 220 includes a reflective material. Each of the first and second barrier walls 210 and 220 is firmed by attaching, a reflective sheet, a metal layer, e.g., titanium oxide (TiO2), or a paint layer to a structure containing a resin, such as polyphthalamide (PPA) or polymethy methcrylate (PMMA), but it should not be limited thereto or thereby.

The optical sheets 130 are disposed between the light guide plate 150 and the display panel 110. The optical sheets 130 control a path of the light guided by the light guide plate 150. The optical sheets 130 include a diffusion sheet 131, a prism sheet 132, and a protective sheet 133.

The diffusion sheet. 131 diffuses the light and the prism sheet 132 collects the diffused light such that a direction in which the diffused light travels substantially coincides with a normal line direction of the display panel 110. The protection sheet 133 protects the prism sheet 132 from external impacts. In the present exemplary embodiment, the optical sheets 130 include one diffusion sheet 131, one prism sheet 132, and one protection sheet 133, but they should not be limited thereto or thereby. That is, at least one of the diffusion sheet 131, the prism sheet 132, and the protection sheet 133 of the optical sheets 130 may be provided in a plural number, and one or more sheets of the optical sheets 130 may be omitted if necessary.

The reflective sheet RS is disposed between the light guide plate 150 and the bottom portion 141. The reflective sheet RS reflects the light leaked from the light guide plate 150 towards the light guide plate 150.

The mold frame 170 is disposed between the display panel 110 and the backlight unit 120. The mold frame 170 includes a supporting part 171 and a frame sidewall 172. The display panel 110 is disposed on the supporting part 171 of the mold frame 170. In the present exemplary embodiment, the mold frame 170 is provided as a member to support the display panel. 110, but it should not be limited thereto or thereby. For instance, according to another embodiment, the mold frame 170 may be omitted. In this case, the display panel 110 is supported by the accommodating part 140, and the accommodating part 140 and the display panel 110 are fixed to each other by an adhesive member (not shown).

According to another embodiment, the display device 100 may further include a top chassis (not shown). The top chassis (not shown) is disposed on the display panel 110 to cover the non-display area of the display panel 110. The top chassis (not shown) is coupled to the accommodating part 140 to support an edge of the display panel 110, and a display window is formed through the top chassis to expose the display area of the display panel 110.

Figure 2:
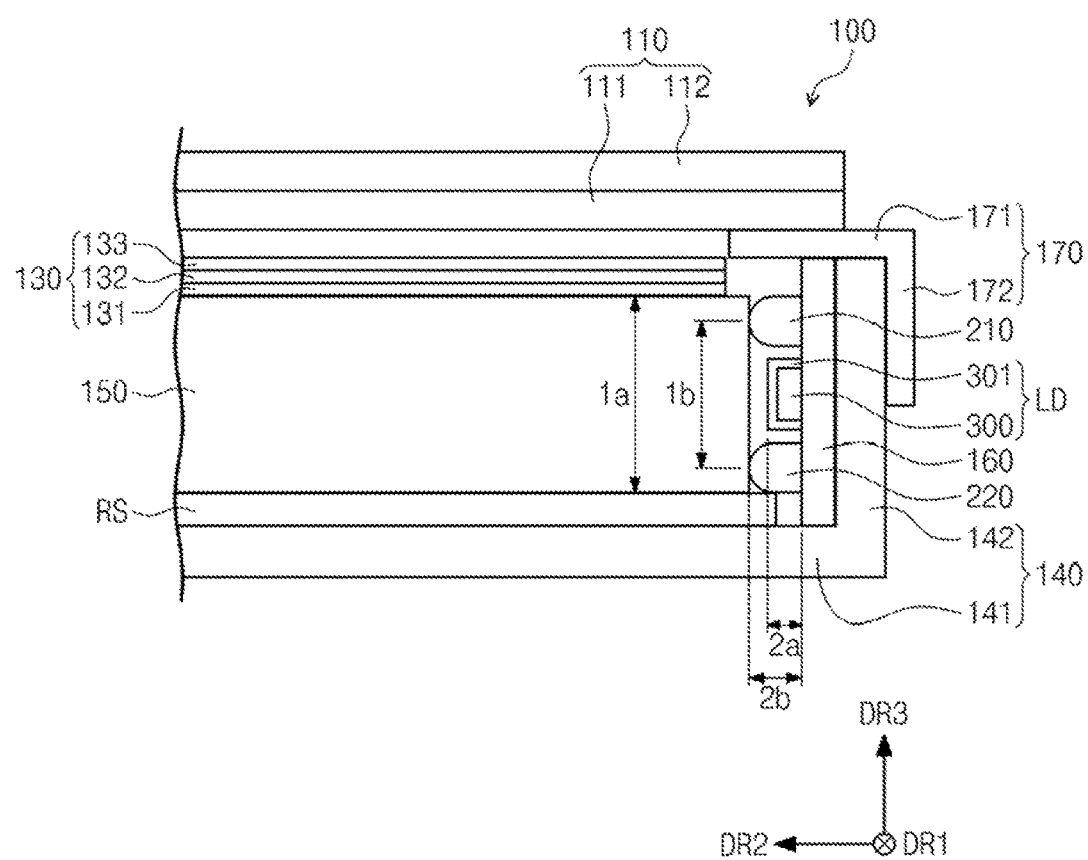
FIG. 2 is a cross-sectional view showing the display device shown in FIG. 1.

FIG. 2 is a cross-sectional view showing the display device shown in FIG. 1. In FIG. 2, the same reference numerals denote the same elements in FIG. 1, and thus detailed descriptions of the same elements will be omitted.

In reference to FIG. 2, the distance $1b$ between the first and second barrier walls 210 and 220 may be smaller than the thickness $1a$ of the light guide plate 150. In addition, a height $2b$ of each of the first and second barrier walls 210 and 220 may be greater than a height $2a$ of each of the light sources LD. Accordingly, the first and second barrier walls 210 and 220 may be interposed between a light incident surface of the light guide plate 150 and the printed circuit board 160 and the light guide plate 150 is spaced apart from the light sources LD by a predetermined distance. Therefore, although the light guide plate 150 is elongated toward the light sources LD by heat applied to the light guide plate 150, the distance between the light guide plate 150 and each of the light sources LD is maintained, by the first and second barrier walls 210 and 220 supporting the light guide plate 150. As a result, the light sources LD may be prevented from being damaged.

In the present exemplary embodiment, each of the light sources LD includes a light emitting diode chip 300 and a fluorescent substance layer 301 covering the light emitting diode chip 300. In this case, the light emitting diode chip 300 may be, but not limited to, a chip emitting a blue light, and the fluorescent substance layer 310 may include a yellow-based fluorescent substance.

Figure 3:
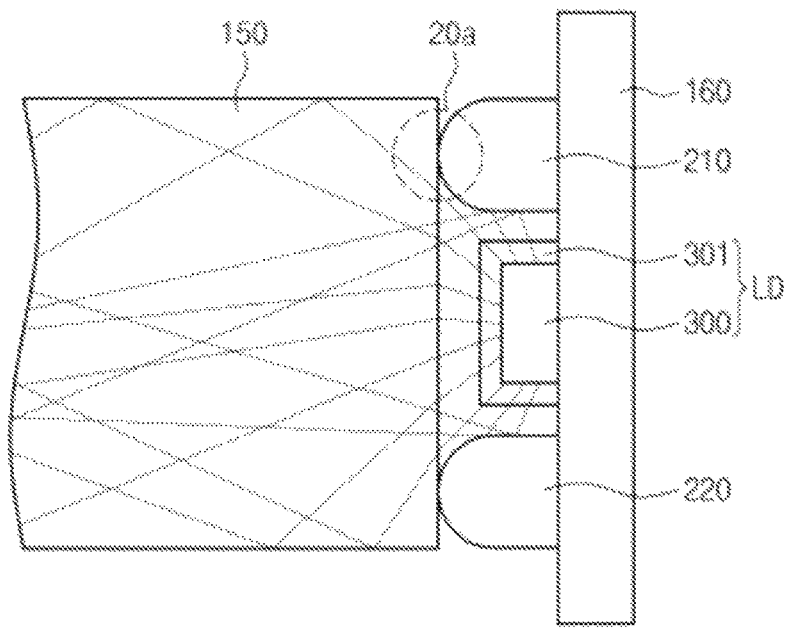
FIG. 3 is a partially enlarged view showing the display device shown in FIG. 2.

FIG. 3 is a partially enlarged view showing the display device shown in FIG. 2. In FIG. 3, the same reference numerals denote the same elements in FIGS. 1 and 2, and thus detailed descriptions of the same elements will be omitted.

In reference to FIG. 3, a surface 20a of each of the first and second barrier walls 210 and 220, which makes contact with the light guide plate 150, may have a round shape. Since the sidewall of the first and second barrier walls 210 and 220, which is adjacent to the light sources LD, has the round shape, the light emitted from the light sources LD is easily reflected to the light guide plate 150.

Different from the present exemplary embodiment, when the first and second barrier walls 210 and 220 have a substantially rectangular shape, the light emitted from the light sources LD and traveling, to a direction substantially parallel to the printed circuit board 160 is continuously reflected between the first and second barrier walls 210 and 220, and not incident to the light guide plate 150. However, according to the present exemplary embodiment, since each of the first and second barrier walls 210 and 220 has the round shape, the light traveling in the direction substantially parallel to the printed circuit board 160 is easily incident to the light guide plate 150 after being reflected by the first and second barrier walls 210 and 220.

The first and second barrier walls 210 and 220 are formed on the printed circuit board 160 by using a syringe. In this case, processes of forming members for the first and second barrier walls 210 and 220 and attaching the members to the printed circuit board 160 may be omitted, and thus a manufacturing process of the display device 100 (refer to FIG. 1) may be simplified.

Figure 4:
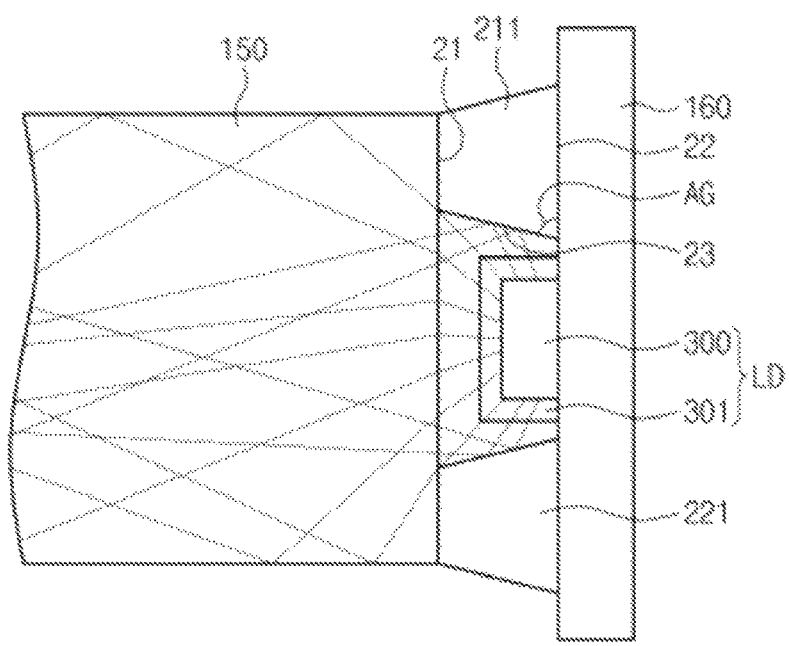
FIG. 4 is a partially enlarged view showing a display device according to another exemplary embodiment of the present disclosure.

FIG. 4 is a partially enlarged view showing a display device according to another exemplary embodiment of the present disclosure. In FIG. 4, the same reference numerals denote the same elements in FIG. 1, and thus detailed descriptions of the same elements will be omitted.

In reference to FIG. 4, a surface 21 of each of first and second barrier walls 211 and 221, which makes contact with the light guide plate 150, has an area smaller than that of a surface 22 of each of the first and second barrier walls 211 and 221, which makes contact with the printed circuit board 160. Each of the first and second barrier walls 211 and 221 has a sidewall 23 inclined with respect to the printed circuit board 160.

An angle AG between the sidewall 23 and the printed circuit board 160 is in a range of about 35 degrees to about 90 degrees. When the angle AG is smaller than about 35 degrees, the thickness of the display device becomes large, and when the angle AG is equal to or greater than about 90 degrees, the amount of the light incident to the light guide plate 150 is reduced.

Figure 5:
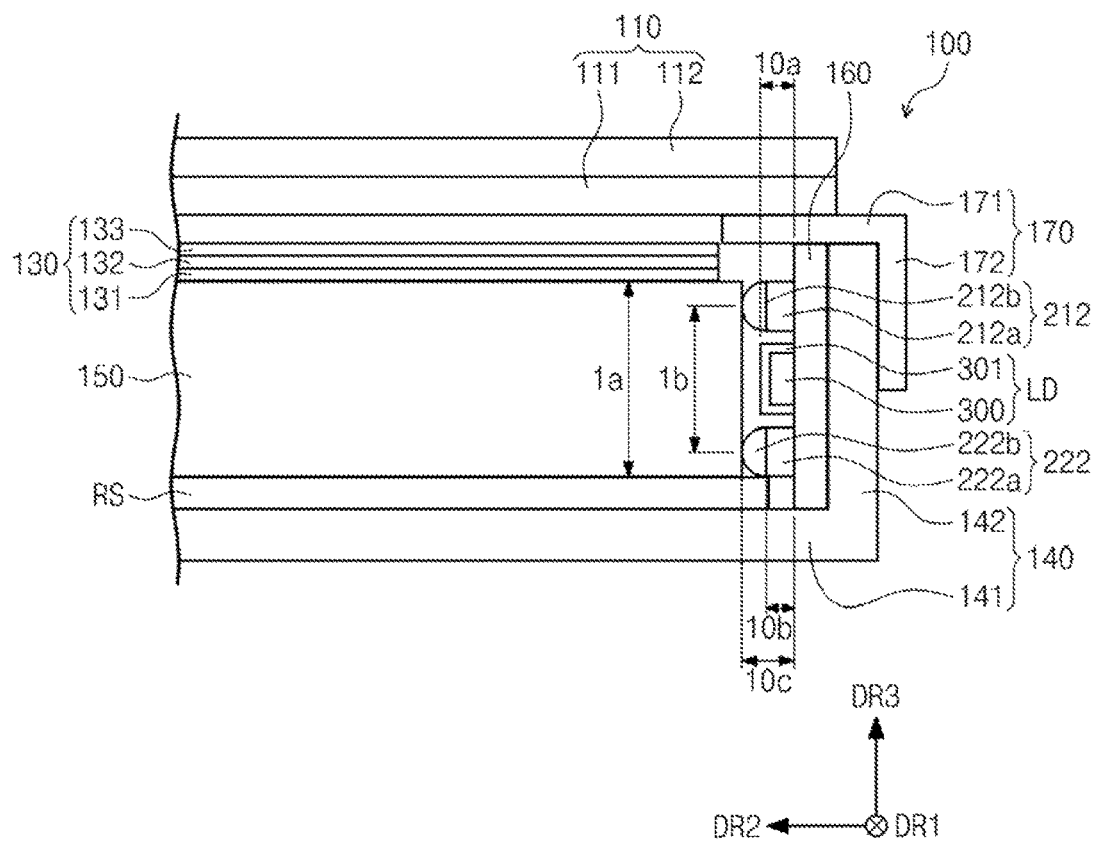
FIG. 5 is a cross-sectional view showing a display device according to another exemplary embodiment of the present disclosure.

FIG. 5 is a cross-sectional view showing a display device according to another exemplary embodiment of the present disclosure. In FIG. 5, the same reference numerals denote the same elements in FIG. 1, and thus detailed descriptions of the same elements will be omitted.

In reference to FIG. 5, a first barrier wall 212 includes a first auxiliary portion 212a and a first elastic portion 212b and a second barrier wall 222 includes a second auxiliary portion 222a and a second elastic portion 222b.

The first and second auxiliary portions 212a and 222a are disposed on the printed circuit board 160. The first elastic portion 212b is disposed on the first auxiliary portion 212a and the second elastic portion 222b is disposed on the second auxiliary portion 222a.

Each of the first and second auxiliary portions 212a and 222a may be a non-elastic member. The first and second auxiliary portions 212a and 222a include a material not having elasticity. The material, which does not have the elasticity, may be a rigid plastic or metal.

The first and second elastic portions 212b and 222b include a member having the elasticity. The first and second elastic portions 212b and 222b include a material having the elasticity, e.g., rubber, silicon, sponge, etc.

Each of the first and second auxiliary portions 212a and 222a has a height 10b equal to or greater than a height 10a of each of the light sources LD, and each of the first and second barrier walls 212 and 222 has a height 10c greater than the height 10a of each of the light sources LD.

The first and second auxiliary portions 212a and 222a support the light guide plate 150 to allow the light sources LD to be spaced apart from the light guide plate 150. Accordingly, the light guide plate 150 may be prevented from colliding with the light sources LD, and thus the light sources ED may be prevented from being damaged.

The first and second elastic portions 212b and 222b are deformed to correspond to a deformation of the light guide plate 150. For instance, when the light guide plate 150 is expanded by the heat, the first and second elastic portions 212b and 222b are compressed by a pressure provided from the light guide plate 150. Therefore, although the light guide plate 150 is expanded, the light guide plate 150 is prevented from being bent in the third direction DR since the first and second elastic portions 212b and 222b are compressed.

According to the present exemplary embodiment, since the first and second auxiliary portions 212a and 222a are disposed adjacent to the light sources LD, the light sources LD may be prevented from being damaged due to the light guide plate 150 even though the first and second elastic portions 212b and 222b are compressed. That is, the light guide plate 150 may be prevented from being bent by the first and second barrier walls 212 and 222 and the light sources LD may be prevented from being due to the light guide plate 150.

Figure 6:
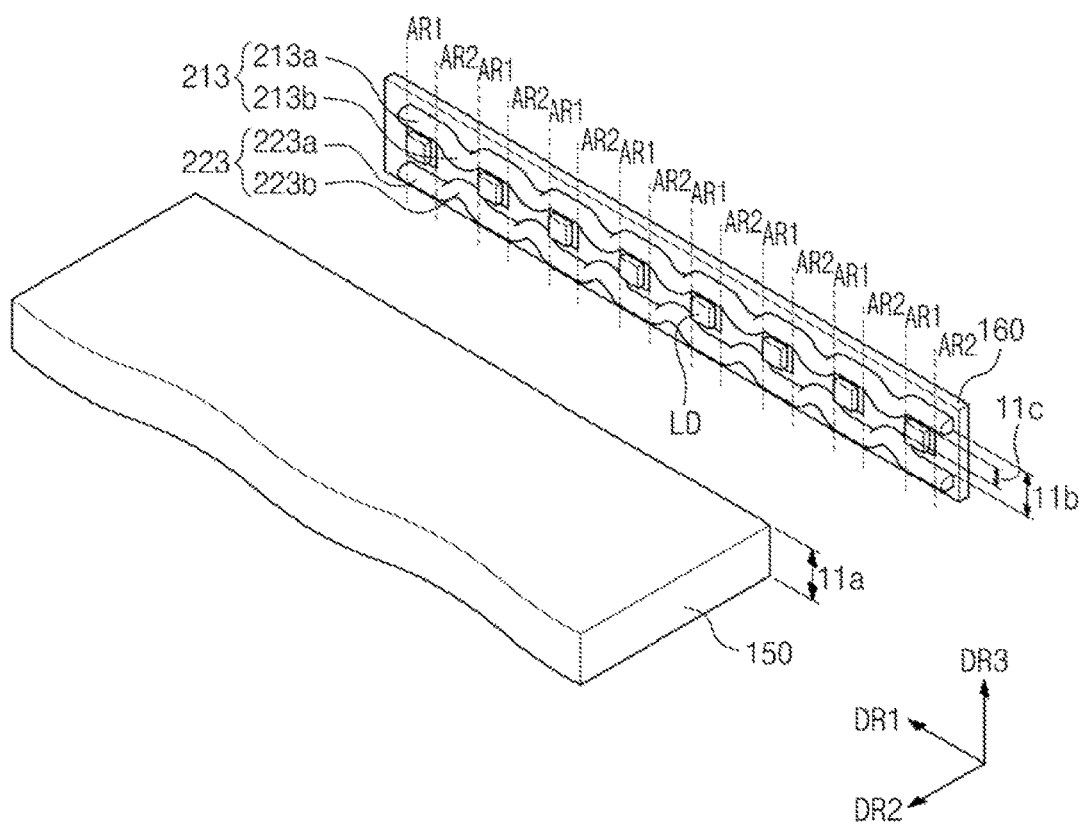
FIG. 6 is a perspective view showing a portion of a display device according to another exemplary embodiment of the present disclosure.

FIG. 6 is a perspective view showing a portion of a display device according to another exemplary embodiment of the present disclosure. In FIG. 6, the same reference numerals denote the same elements in FIG. 1, and thus detailed descriptions of the same elements will be omitted.

In reference to FIG. 6, a printed circuit board 160 is disposed at one side of the light guide plate 150 and first and second areas AR1 and AR2 are alternately defined on the printed, circuit hoard 160. The light sources LD are mounted on the first areas AR1 among the first and second areas AR1 and AR2.

As the light guide plate 150 becomes thinner, the light guide plate 150 has a thickness 11a of about 1.51 nm or less. In this case, a first distance 11b between first and second barrier walls 213 and 223 in the first areas AR1 is greater than the thickness 11a of the light guide plate 150 by a width in the third direction DR3 of the light sources LD. In the present exemplary embodiment, the first barrier wall 213 is bent toward the second barrier wall 223 in the second areas AR2 and the second barrier wall 223 is bent toward the first barrier wall 213 in the second areas AR2. Accordingly, a second distance lie between the first and second barrier walls 213 and 223 in the second areas AR2, which corresponds to a minimum distance between the first and second barrier walls 213 and 223, is smaller than the thickness 11a of the light guide plate 150.

The first barrier wall 213 includes a first reflective member 213a disposed in the first area AR1 and a first support member 213b disposed in the second area AR2. The first support member 213b of the first barrier 213 corresponds to a portion convexly bent toward the second barrier wall 223. The first reflective member 213a and the first support member 213b reflect the light emitted from the light sources LD and the first support member 213b supports the light guide plate 150 to allow the light sources LD to be spaced apart from the light guide plate 150.

The second barrier wall 223 includes a second reflective member 223a disposed in the first area AR1 and a second support member 223b disposed in the second area AR2. The second support member 223b of the second barrier 223 corresponds to a portion convexly bent toward the first barrier wall 213. The second reflective member 223a and the second support member 223b reflect the light emitted from the light sources LD and the second support member 223b supports the light guide plate ISO to allow the light sources LD to be spaced apart from the light guide plate 150.

The first and second support members 213b and 223b are spaced apart from each other. Therefore, spaces between the light sources LD are exposed. Since the spaces between the light sources LD are not covered by the first and second support members 213b and 223b, the light radiation angle in the first direction DR1 of each of the light sources LD is not reduced. Thus, the distance between the light sources LD becomes larger and the number of the light sources LD is reduced. In addition, since the light radiation angle in the first direction DR1 of each of the light sources LD becomes larger, a hot spot phenomenon, in which brightness in the area adjacent to the light incident surface of the light guide plate becomes irregular, is reduced.

The first and second barrier walls 213 and 223 are easily formed using the syringe. According to another embodiment, the first and second barrier walls 213 and 223 may be attached to the printed circuit board 160 after being formed by an injection molding process.

In the present exemplary embodiment, the cross-section of the first and second barrier walls 213 and 223 are substantially the same as that shown in FIG. 3, but it should not be limited thereto or thereby. That is, according to another embodiment, the cross-section of the first and second barrier walls 213 and 223 may be substantially the same as that shown in FIG. 4 or 5.

Figure 7:
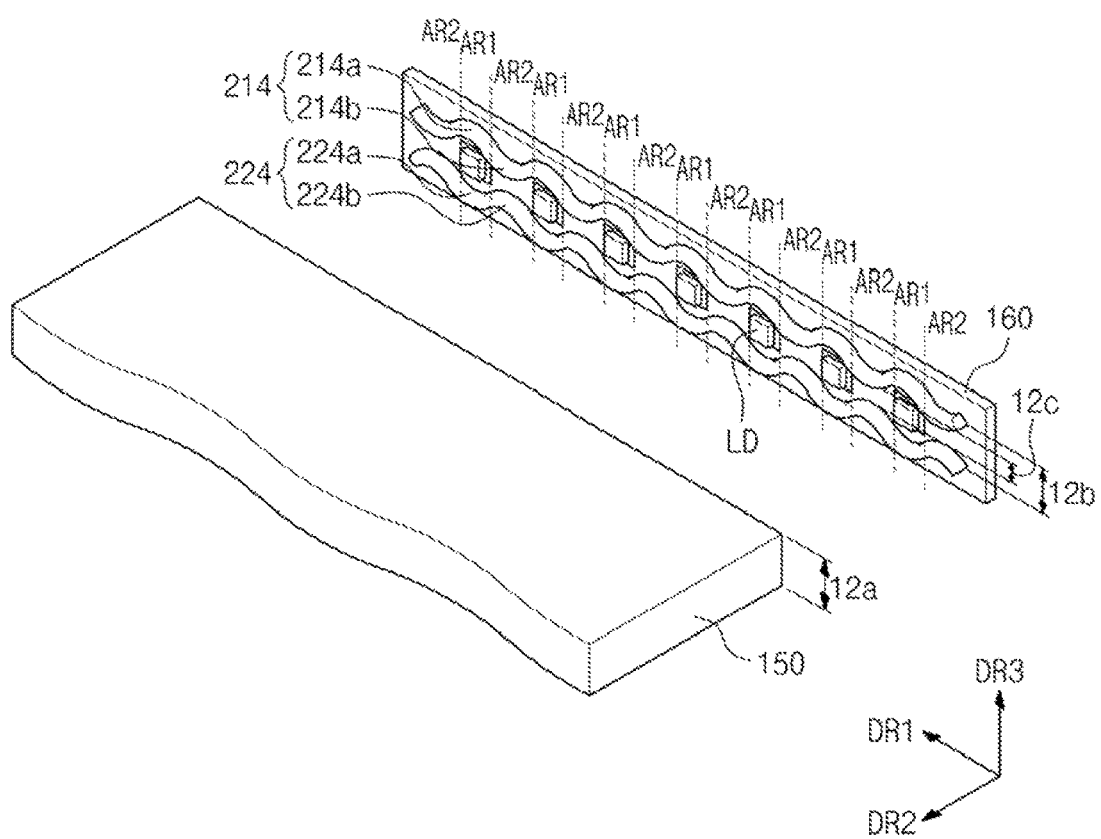
FIG. 7 is a perspective view showing a portion of a display device according to another exemplary embodiment of the present disclosure.

FIG. 7 is a perspective view showing a portion of a display device according to another exemplary embodiment of the present disclosure. In FIG. 7, the same reference numerals denote the same elements in FIG. 6, and thus detailed descriptions of the same elements will be omitted.

In reference to FIG. 7, each of first and second barrier walls 214 and 224 has a wave pattern shape extending in the first direction DR1.

The first barrier wall 214 includes a first reflective member 214a disposed in the first area AR1 and a first support member 214b disposed in the second area AR2. The first reflective member 214a is convexly bent in a direction far away from the second barrier wall 224 and the first support member 214b is convexly bent toward the second barrier wall 224 from the first barrier wall 214. The first reflective member 214a and the first support member 214b reflect the light emitted from the light sources LD to the light guide plate 150, and the first support member 214b supports the light guide plate 150 to allow the light sources LD to be spaced apart from the light guide plate 150.

The second barrier wall 224 includes a second reflective member 224a disposed in the first area AR1 and a second support member 224b disposed in the second area AR2. The second reflective member 224a is convexly bent in a direction fir away from the first harrier wall 214 and the second support member 224b is convexly bent toward the first barrier wall 214 from the second barrier wall 224. The second reflective member 224a and the second support member 224b reflect the light emitted from the light sources LD to the light guide plate 150, and the second support member 224b supports the light guide plate 150 to allow the light sources LD to be spaced apart from the light guide plate 150.

In the present exemplary embodiment, the first barrier wall 214 is spaced apart from the second barrier wall 224 by a first distance 12b in the first areas AR1 and spaced apart from the second barrier wall 224 by at least a second distance 12c in the second areas AR2. The first distance 12b of the first areas AR1 is different from the second distance 12c of the second areas AR2, which corresponds to a minimum distance in the second areas AR2. The second distance 12c is smaller than a thickness 12a of the light guide plate 150, and as a result, the light guide plate 150 is spaced apart from the light sources LD by the first and second barrier walls 214 and 224 and supported by the first and second barrier walls 214 and 224. Height 12b is greater than height 12a.

In the present exemplary embodiment, the cross-section of the first and second barrier walls 214 and 224 are substantially the same as that shown in FIG. 3, but it should not be limited thereto or thereby. That is, according to another embodiment, the cross-section of the first and second barrier walls 213 and 223 may be substantially the same as that shown in FIG. 4 or 5.

Figure 8:
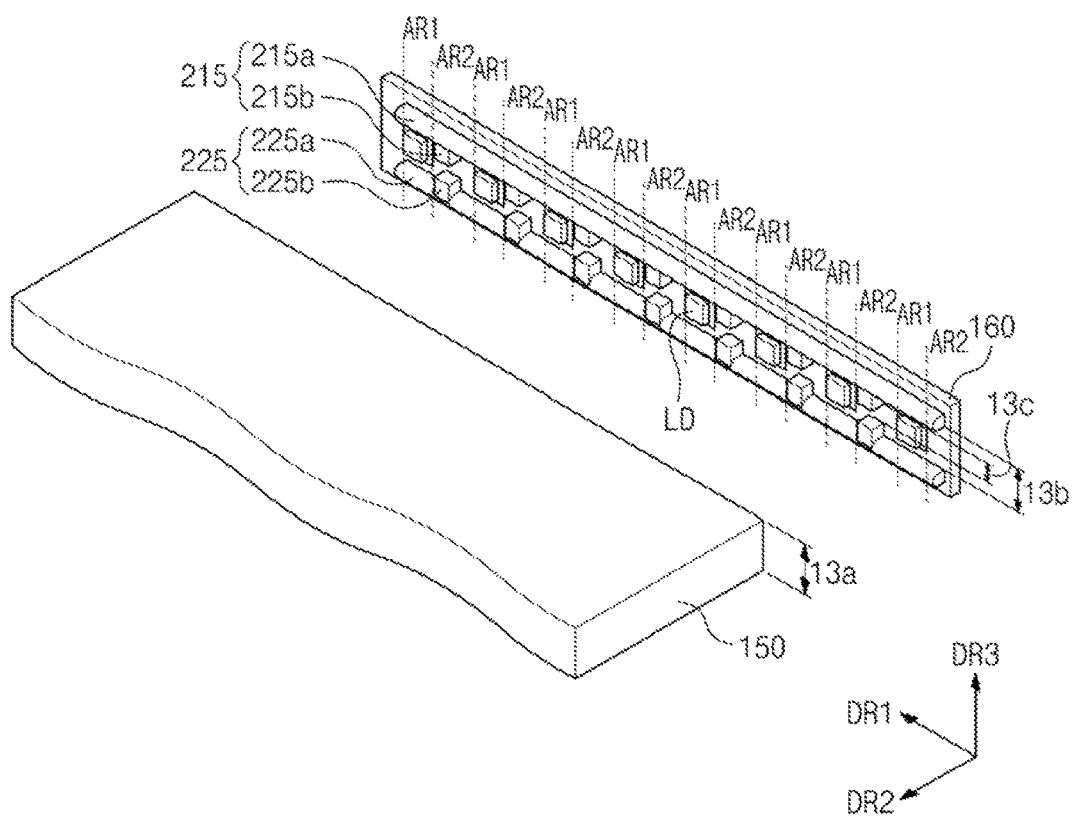
FIG. 8 is a perspective view showing a portion of a display device according to another exemplary embodiment of the present disclosure.

FIG. 8 is a perspective view showing a portion of a display device according to another exemplary embodiment of the present disclosure. In FIG. 8, the same reference numerals denote the same elements in FIG. 6, and thus detailed descriptions of the same elements will be omitted.

In reference to FIG. 8, a first barrier wall 215 includes a first reflective member 215a and a first support member 215b and a second barrier wall 225 includes a second reflective member 225a and a second support wall 225b.

Each of the first and second reflective members 215a and 225a extends in the first direction DR1, in which the light sources LD are arranged, and is disposed on the first and second areas AR1 and AR2. Each of the first and second reflective members 215a and 225a has a straight line shape and includes a reflective material. Each of the first and second reflective members 215a and 225a is formed by attaching a reflective sheet, a metal layer, e.g., titanium oxide (TiO2), or a paint layer to a structure containing, a resin, such as polyphthalamide (PPA) or polymethy methcrylate (PMMA), but it should not be limited thereto or thereby.

Each of the first and second support members 215b and 225b is disposed in the second area AR2. The first support member 215b is protruded from the first reflective member 215a toward the second barrier wall 225. The second support member 225b is protruded from the second reflective member 225a toward the first barrier wall 215.

In the present exemplary embodiment, the first barrier wall 215 is spaced apart from the second barrier all 225 by a first distance 13b in the first areas AR1 and spaced apart from the second barrier wall 225 by at least a second distance 13c in the second areas AR2. The first distance 13b of the first areas AR1 is different from the second distance 13c of the second areas AR2, which corresponds to a minimum distance in the second areas AR2. The second distance 13c is smaller than a thickness 13a of the light guide plate 150, and as a result, the light guide plate 150 is spaced apart from the light sources LD by the first and second barrier walls 215 and 225 and supported by the first and second barrier walls 215 and 225. Height 13b is greater than height 13a.

The first and second support members 215b and 225b include the same material as that of the first and second reflective members 215a and 225a, and the first and second support members 215b and 225b may include only a light transmissive material.

When the first and second support members 215b and 225b include only the light transmissive material, the light emitted from each of the light sources LD travels in the first direction DR1 without being reflected by the first and second support members 215b and 225b. Accordingly, the light radiation angle in the first direction DR1 of the light emitted from each of the light sources LD is not reduced, and as a result, a distance between the light sources LD spaced apart from each other in the first direction DR1 becomes large, and thus the number of the light sources LD is reduced.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A display device comprising:
    a display panel receiving light and displaying an image;
    a light guide plate guiding the light to the display panel;
    a printed circuit board disposed adjacent to one side of the light guide plate and comprising a plurality of first and second areas alternately defined one by one therein;
    a plurality of light sources mounted on the printed circuit board to correspond to the plurality of the first areas and to supply the light to the light guide plate;
    a first barrier wall disposed on the printed circuit board and extending in a direction in which the light sources are arranged; and
    a second barrier wall facing the first barrier wall such that the light sources are disposed between the first and second barrier walls, the second barrier wall disposed on the printed circuit board and extending in the direction in which the light sources are arranged,
    wherein a first distance between the first and second barrier walls in each of the plurality of the first areas is greater than a second distance between the first and second barrier walls in each of the plurality of the second areas, and the second distance is smaller than a thickness of the light guide plate.

2. The display device of claim 1, wherein the first barrier wall comprises:
    a first reflective member disposed in the plurality of the first areas and reflecting the light emitted from the light sources to the light guide plate; and
    a first support member disposed in the plurality of the second areas and supporting the light guide plate to allow the light sources to be spaced apart from the light guide plate, and the second barrier wall comprises:
    a second reflective member disposed in the plurality of the first areas and reflecting the light emitted from the light sources to the light guide plate; and
    a second support member disposed in the plurality of the second areas and supporting the light guide plate to allow the light sources to be spaced apart from the light guide plate.

3. The display device of claim 2, wherein, when the first reflective member and the first support member are integrally formed with each other and the second reflective member and the second support member are integrally formed with each other, the first barrier wall is bent toward the second barrier wall in the plurality of the second areas and the second barrier wall is bent toward the first barrier wall in the plurality of the second areas.

4. The display device of claim 2, wherein each of the first and second reflective members extends in the direction, in which the light sources are arranged, and is disposed on the plurality of the first and second areas, the first support member is protruded from the first reflective member to the second barrier wall in the plurality of the second areas, and the second support member is protruded from the second barrier wall to the first barrier wall in the plurality of the second areas.

5. The display device of claim 4, wherein the first and second reflective members comprise a reflective material and the first and second support members comprise a light transmissive material.

6. The display device of claim 1, wherein the first barrier wall comprises:
    a first auxiliary portion disposed on the printed circuit board; and
    a first elastic portion disposed on the first auxiliary portion and having elasticity, and the second barrier wall comprises:
    a second auxiliary portion disposed on the printed circuit board; and
    a second elastic portion disposed on the second auxiliary portion and having elasticity.

7. The display device of claim 1, wherein each of the first and second barrier walls has a height greater than a height of the light sources.

8. The display device of claim 1, wherein a cross-section of each of the first and second barrier walls has a width gradually decreasing as a distance from the printed circuit board becomes larger.

9. The display device of claim 8, wherein a surface of each of the first and second barrier walls, which makes contact with the light guide plate, has a round shape.

10. The display device of claim 8, wherein each of the first and second barrier walls comprises a sidewall inclined with respect to the printed circuit board.

11. The display device of claim 1, wherein each of the light sources is a chip-on-board (COB) type light emitting diode (LED).

12. The display device of claim 1, wherein each of the first and second barrier walls comprises a reflective material.

13. A display device comprising:
    a display panel receiving light and displaying an image;
    a light guide plate guiding the light to the display panel;
    a plurality of light sources disposed adjacent to one side of the light guide plate to supply the light to the light guide plate;
    a printed circuit board on which the light sources are mounted;

a first barrier wall disposed on the printed circuit board and extending in a direction in which the light sources are arranged; and a second barrier wall facing the first barrier wall such that the light sources are disposed between the first and second barrier walls and extending in the direction in which the light sources area arranged, wherein the first and second barrier walls are interposed between the printed circuit board and the light guide plate, and an area of a surface of each of the first and second barrier walls, which makes contact with the light guide plate, is smaller than an area of a surface of each of the first and second barrier walls, which makes contact with the printed circuit board, and wherein a surface of each of the first and second barrier walls, which makes contact with the light guide plate, has a round shape.

14. The display device of claim 13, wherein each of the first and second barrier walls comprises a sidewall inclined with respect to the printed circuit board.

* * * * *